US008189852B2

(12) United States Patent
Cornell

(10) Patent No.: US 8,189,852 B2
(45) Date of Patent: May 29, 2012

(54) METHOD OF CREATING, USING AND MAINTAINING LINKS IN FILE ARCHIVES

(76) Inventor: Lars Cornell, Lofta (SE)

( * ) Notice: Subject to any disclaimer, the term of this patent is extended or adjusted under 35 U.S.C. 154(b) by 1077 days.

(21) Appl. No.: 11/146,275

(22) Filed: Jun. 7, 2005

(65) Prior Publication Data

US 2006/0036662 A1   Feb. 16, 2006

Related U.S. Application Data

(60) Provisional application No. 60/598,534, filed on Aug. 4, 2004.

(51) Int. Cl.
*G06K 9/00* (2006.01)
(52) U.S. Cl. ........................................... 382/100
(58) Field of Classification Search .................. 382/100; 707/104.1, 102; 715/772
See application file for complete search history.

(56) References Cited

U.S. PATENT DOCUMENTS

2002/0103813 A1*  8/2002  Frigon .................. 707/104.1
2003/0063770 A1*  4/2003  Svendsen et al. ............. 382/100

OTHER PUBLICATIONS

Adobe Photoshop 7.0 User Guide for windows and Macintosh, copyright 2002.*

* cited by examiner

*Primary Examiner* — Claire X Wang
(74) *Attorney, Agent, or Firm* — Nixon & Vanderhye PC

(57) ABSTRACT

Digital files containing data directly representing objects, such as graphical files, text documents, are linked to each other using XML- and XMP-technology. Additional link information is stored in the original digital files, eliminating any of use of databases, link data and the original data of the file thus being packed together in one single file. Composite structures, e.g. family structures or structures describing relics of antiquity observed on a geographical map, are formed. Interconnecting such distributed information can also be made over the Internet. The links are formed between objects and/or events, associated with the original digital files, and relations between objects and between objects and events are defined to describe a hierarchical order.

8 Claims, 11 Drawing Sheets

RANK

Link 111

Picture with single object.

Link 112

Picture with event.

Link 115

BIO-link

Link 113

Picture with single object.

METHOD OF CREATING, USING AND MAINTAINING LINKS IN FILE ARCHIVES

RELATED APPLICATION

This application claims priority and benefit from U.S. provisional patent application No. 60/598,534, filed Aug. 4, 2004, the entire teachings of which are incorporated herein by reference.

FIELD OF THE INVENTION

The present invention relates to a method of creating, using and maintaining links in file archives and to devices and systems adapted therefor.

BACKGROUND

For a digital archive often a need exists for describing or defining the relation of the objects represented by the digital files in the archive to each other, such as whether the objects belong to each other or to groups of objects, such groups created for special purposes, or whether the object is classified according to some standard. The objects are represented by digital data in the digital files, these files called content files, that normally contain information representing a single object but can also contain information representing more than one object. Each such file containing a single object holds the information or raw digital data required for building the object, e.g. a single text, a single picture or a sound. Generally thus, the content files have contents such as the very digital data or information building texts and pictures, i.e. the digital characters representing the alphanumerical characters of texts and the digital characters representing the pixels of pictures.

In such digital archives of documents and/or pictures, sound, movies, etc. the handled entities are basically the content files themselves that contain the digital data representing text, pictures, etc. The common method of handling such digital archives and of describing the contents of the content files is to store information, herein called metadata, describing the contents of each content file in a database 101, see FIG. 1. In the database, also links, as illustrated by the lines 103, or equivalently pointers or addresses such as URLs, to the files 105 are stored, allowing the content files to be retrieved when required. Disadvantages of such database technology include that databases often are costly, require specially trained persons for maintenance and also require a high degree of discipline and accuracy of the persons maintaining the database. Thus, such traditional databases generally require costly manual work of the persons maintaining the databases and therefore, they are not widely used by private persons and families. Another disadvantage is that such technology is centralistic, i.e. the database is a central facility for all information except the very content files, and hence that the information associated with the objects is located outside the files holding the objects and hence, when the files are moved, such metadata do no automatically accompany the files in which the objects are stored. Also, as in all centralistic systems, the information flow is monodirectional, i.e. from the database towards the users who in most cases are not allowed to influence the contents of the database.

The information associated with or for objects, such metadata can include information describing or defining the relation of the objects to each other, whether objects belong to or are associated with each other or belong to groups of objects, such groups created for special purposes, or whether the object is classified according to some standard. Then, the database includes one or more tables of data and relations for objects and also of links, or equivalently of pointers or addresses, to digital files containing data representing the objects.

In the Internet or World-Wide-Web html-technology is used for maintaining the connection between database data or metadata and the files containing the data representing the texts, pictures, etc. Such technology can be considered as being contrary of conventional database technology. Information can be freely transmitted and retrieved without using any kind of hierarchical structure. However, databases are often used for supplementing Internet pages, information from the databases retrieved e.g. when a user actively selects the information. When e.g. a picture is transported by the Internet or by e-mail the content file, i.e. a graphical file, and the metadata, included in a HTML-file, are transferred separately to the computer of a user. By the Internet browser running in the user's computer the received two files are composed to form the picture that can be seen on the user's computer monitor together with text from the metadata. However, constructing HTML-files is complicated, requires special trained personnel and is therefore not often used by untrained people such as family members and office staff. A similar procedure is required in the case where all picture data is transmitted in an e-mail message.

Thus, a need has existed for technology that allows that in every file that contains e.g. graphical data or pixel data, also key information such as creator, owner, i.e. the part having the right to the picture, camera settings, information on the different objects seen in the picture. In the 1980-ies IPTC-technology started to be used for this purpose.

A few years later, the world standard format XML was created for transferring information over the Internet and similar networks. From about 2000 XML has been widely used and a plurality of XML-files, such files having the file extension .xml, exist in almost all computers of today. The company ADOBE, which is the market leader in the field of graphical computer programs, introduced the XML-technology in their commonly used portable document files, i.e. the pdf-files, and graphical files about 2001. The concept used by ADOBE is called XMP and is an open XML-application.

SUMMARY

It is an object of the invention to provide a method and a computer program eliminating the technical disadvantages and the high costs of database technology in handling digital file archives of documents, pictures, etc., the file archives having any size, including a few or a multitude of files.

It is another object of the invention to provide a method and a computer program to handle objects and events represented in or by document files, picture files, etc. and in particular to link objects to each other, objects to events, and events to other events or to objects in an intelligent way that is useful for Material-and-Production-Control, genealogic research, organization charts, manufacturing processes, police work, archeological research, etc. as well as more simple tasks as family pictures from a wedding event, etc.

It is a further object of the invention to provide a method and a computer program for making links between objects and/or events work in world-wide file archives.

The method that will be described herein is based on preferably XML-technology and in particular on XMP-technology. Using the XMP-technology, information stored in original files, which are most often document (text), graphical or sound files, holding the raw data, the traditionally used databases are eliminated. Using links, constructed e.g. using the XML-technology, the original files, e.g. text files and graphical files, can be coupled to each other to form composite structures, e.g. a family structure or a structure describing relics of antiquity observed on a geographical map. Interconnecting such distributed information can also be made over the Internet and similar general purpose networks, this being impossible using traditional database technology.

Using the method, it will be possible to find and connect to unknown file archives in other countries and therefrom find further file archives without the use of databases and database technology.

The method provides compatibility with all programs capable of handling the XMP-format.

The method is preferably implemented with the support of ADOBE XMP-open source in TIFF-, JPEG- and PDF-files and also in folders. The method can also include files based on Microsoft technology such as DOC-, PPS- and XLS-files from MS-Word, MS-Powerpoint and MS-Excel programs or equal. Also movie files such as MPEG-, AVI- and rs-files and music files such as MP(x)-files can be included. The method can also be used in clean XML-files.

Thus generally, a method of creating, using and maintaining links between objects and also between objects and events in digital file archives is based on XML-formatted data included in document files, picture files, etc., preferably having the XMP-format, instead of being based on the traditionally used database- and/or HTML- and/or IPTC-technology, this making the method cost saving. According to the method, for every content file, the metadata and the original data of the content file, such as the very picture data, etc., are packed together, using XML/XMP-technology, to form one single file. This makes the handling of metadata much easier allows also untrained people to construct linked structures.

A text document, a picture document such as a graphical file, etc. is in most existing systems a single unit and the details thereof cannot normally be digitally identified. Such details can be for example each person in a group of people, individual houses etc. on a map or details on a picture from a car accidence. According to the method described herein a multitude of objects in every document, picture, etc. can be identified. The method is object- and event-oriented whereas other systems normally are file-oriented.

Traditionally used database systems have pointers such as URLs to files. The method as described herein uses links between objects and/or events. Such links are so designed using a specially created concept called RANK allowing the links to describe a hierarchical order. The use of RANK information structures organization schemes, material and production (MAP) control, i.e. relation between fragments and parts of systems, and family trees can be described and determined.

Traditionally used systems are based on filenames and URLs. Many files can have the same name, names can be changed and files can be moved thus causing broken links which can be difficult to repair. The method as described herein uses a unique identifier for each object or event. Using suitable algorithms broken links can most often be automatically repaired.

The pointers in database systems are centralistic—database to file A, database to file B, database to file C, etc., as seen in FIG. 1, and the information flow is monodirectional, i.e. from the database towards the users who in most cases are not allowed to influence the contents of the database. This limits the use to be in one computer only and pointers to be from one computer only. Cooperation between many databases is not easy and is seldom done.

The links in the method described herein are distributed—object No. 1 to object No. 2 to object No. 3 to object No. 4 to object No. 5, etc. The objects and events linked together are not limited to be in one computer only. Using the Internet such linking-chains can be spread all over the world—provided the computers carrying the files are connected to the Internet. The method makes it possible to link objects included in other file collections, that are in advance unknown to a user, over large distances by the use of the Internet, in a way that is not possible using with traditional databases and/or HTML-technology.

The method as described herein is easy to use and cost saving and requires less working hours than traditionally used database systems.

1. The method as described herein is based on XML-formatted data in document and picture files (XMP) instead of traditionally used database- or HTML-technology.

2. The method as described herein is object- and event-oriented whereas other methods handle content files, such as text files and graphical files.

3. The method as described herein can handle many objects or events in one document or graphical file.

4. In the method as described herein links can be created between objects and events.

5. In the method as described herein each link can include an operator describing the relation between objects and/or events.

6. In the method as described herein a UID, unique identifier, is used in links, so that objects will be found even if they are moved or filenames have been changed.

7. In the method as described herein RANK information is used in links allowing the handling of structures such as organization schemes, MOPs and family trees.

8. The method as described herein makes it possible to link objects in different file archives over large distances by the use of the Internet.

9. The method as described herein is cost saving and requires less working hours than traditionally used database systems.

DEFINITIONS

URL: Universal Resource Locator, i.e. basically an address of a file.

XML: Information organized as specified by the W3C-group.

XMP: An XML-implementation specified by ADOBE.

Metadata: Information that can be described as information about information.

Object: A person or a thing or a place or a group of individuals identified on a picture or in a document or file.

Event: For example a marriage, two wooden pieces being glued together, a car crash. Objects and events are handled in the same way in the method described herein.

XML-link: A string of digital information having a special format holding metadata referring to one or more objects and events and a compound pointer from one object or event to another object or event.

Formats for representing various kinds of information e.g. include:

TIF, TIFF: Format of files digitally representing a picture.

JPG, JPEG: Format of files digitally representing a picture.

PDF: Format of files holding compound information, such as text, picture and sound information.

XML: Format of text or meta information.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

Figure 1:
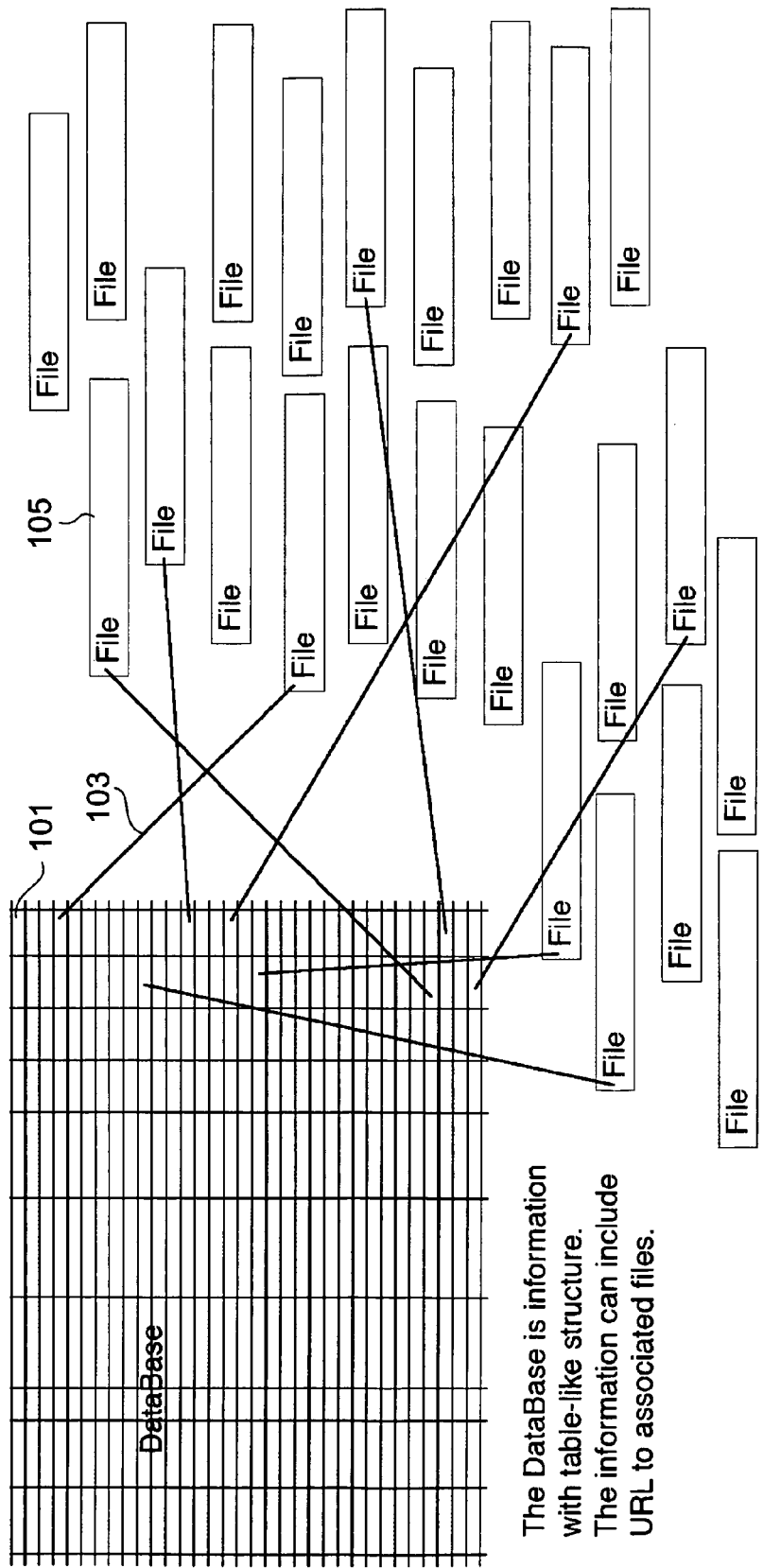
FIG. 1 is a schematic illustrating traditional database technology to store metadata including pointers to files.
Figure 2:
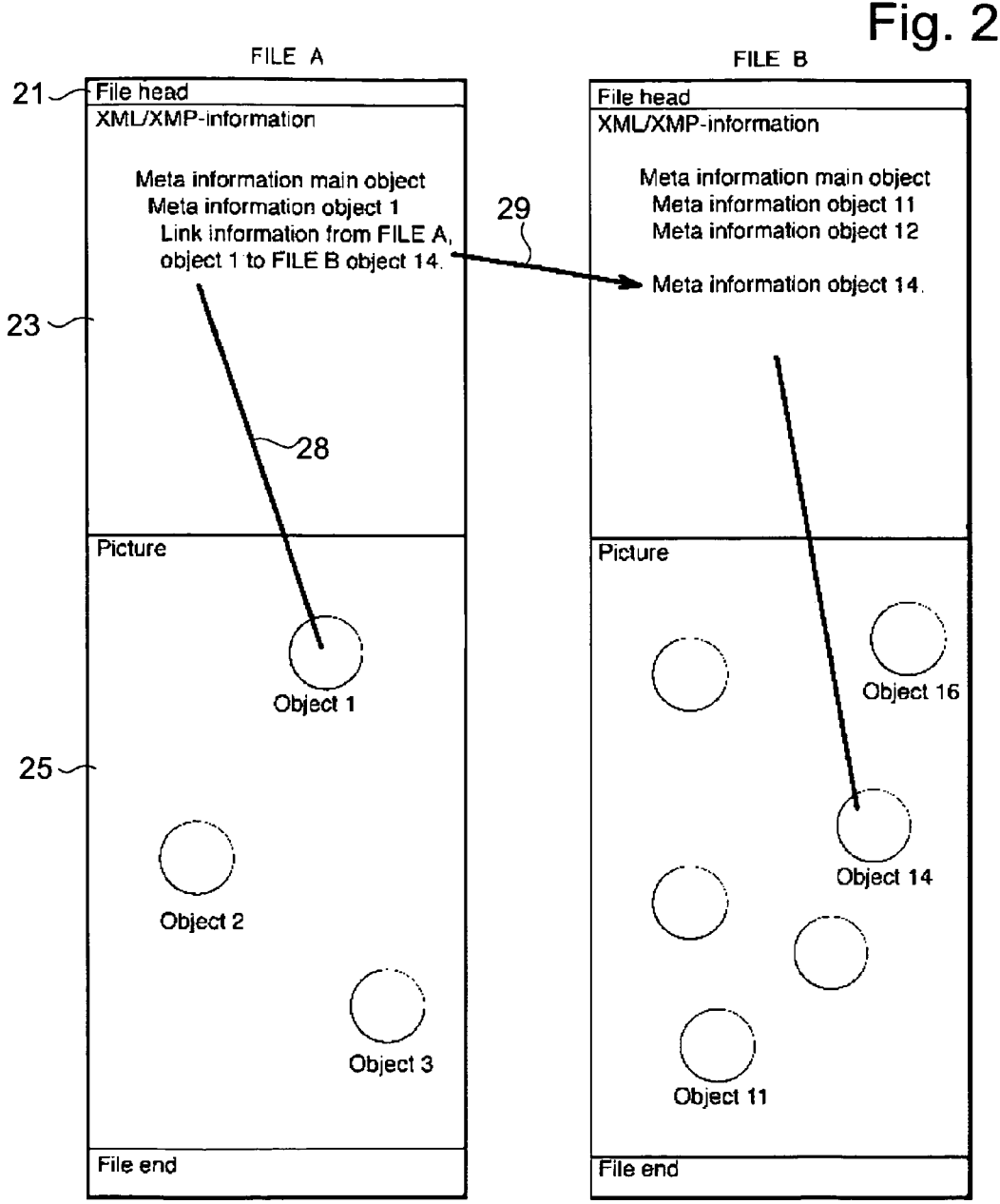
FIG. 2 is a schematic illustrating the method described herein including files having compound links to objects in other files.

In FIG. 2 is schematically illustrated how two files, files A and B, can be linked to each other. The files have a special format but can e.g. generally conform to the format of XMP-files, as defined by ADOBE, and they are in the following called modified archive files. The modified archive files have generally a field 21 for a file head and a field 23 for XML-information. The field for XML-information contains metadata of a main object, the main object generally being the total object or item represented by the data of the following field 25, called the object field, and optionally metadata of one or more subobjects included in the main object, see the solid lines 27. The subobjects are thus represented by portions of the data in the object field 25. The subobjects are numbered subobject No. 1, subobject No. 2, etc. and they are in the figure represented by the circles 28 inside the object fields 25. In the metadata link information is included. In the example shown, in file A there is link information from subobject No. 1 in this file to subobject No. 14 in file B, the linking being represented by the arrow 29 from metadata of file A to metadata of file B.

Now a procedure for creating the modified archive files will be described. It is first assumed that a plurality of digital files 1 containing objects are stored in an archive 2, see the schematic of FIG. 3. Between the objects of the files relations can exist, as indicated by the dotted lines 3. A program indicated by the block 4 is started and the files 1 are processed. From the files metadata are extracted or metadata is added in the files from other sources, not shown, such as from a user's own knowledge.

The relations between objects can be identified by manually, using e.g. the computer mouse, pointing to a file that includes at least one object and is to be linked to an object included in another file as will be described hereinafter.

In working with file archives new files are added and others are updated. In conventional database technology such changes must usually be made manually and can more seldom be made automatically, the changes then entered in the link records of the database. Using the method disclosed herein such handling is not required since changes are directly made in the modified archive files, such as adding more link information.

Figure 3:
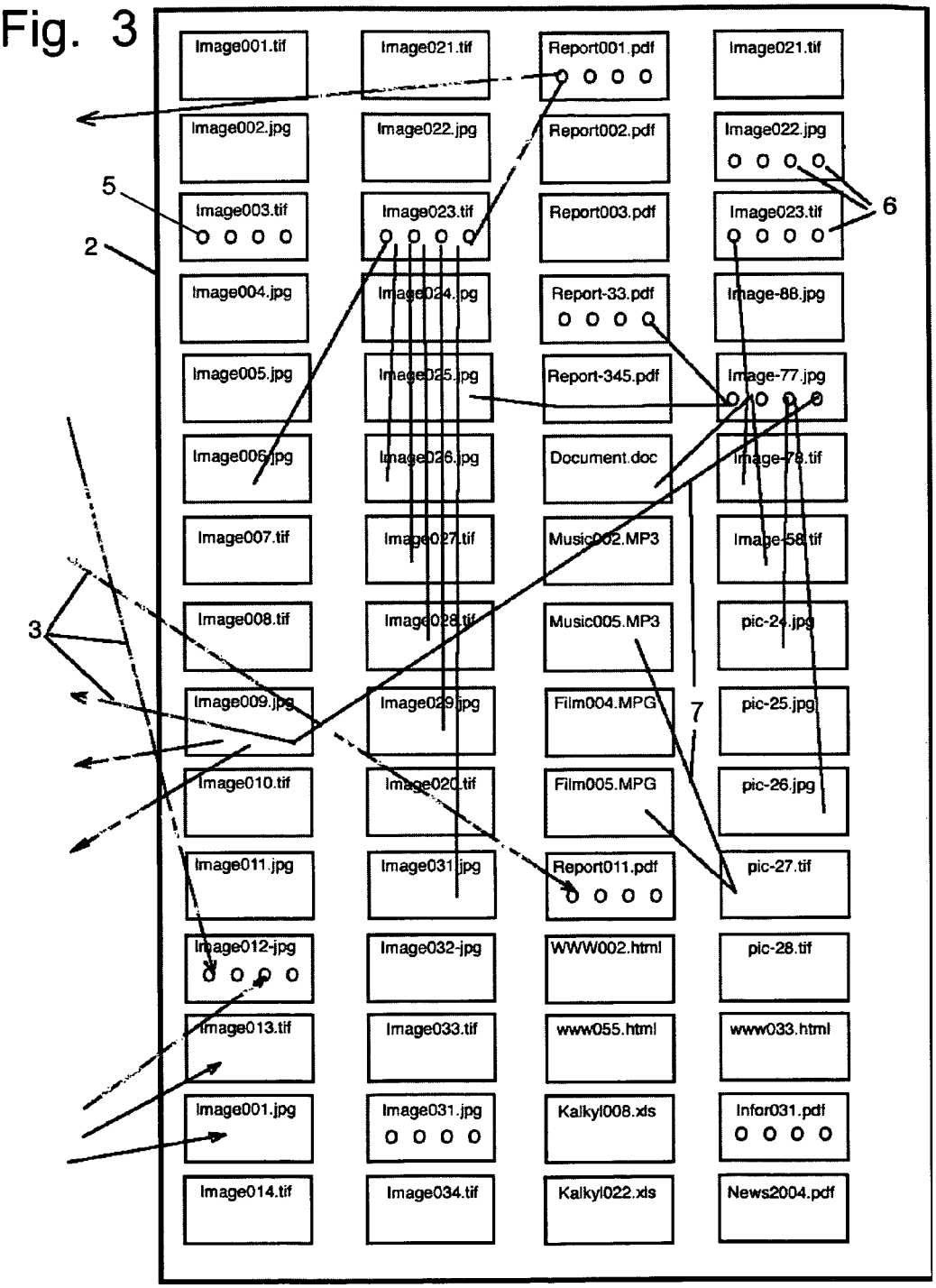
FIG. 3 is a schematic of a digital file archive.

The links are formed in a program such as that indicated at 4 in FIG. 3 by first finding two objects included in different files that are to be linked, icons of these two object shown on the computer display, and then placing the icon of a second of these two objects by a drag-and-drop procedure in a linking space or linking field, provided for the first of the two objects in the displayed picture, the linking space e.g. being displayed as a drop icon. In this operation new link information is placed in the file containing the first of the two objects.

Figure 4:
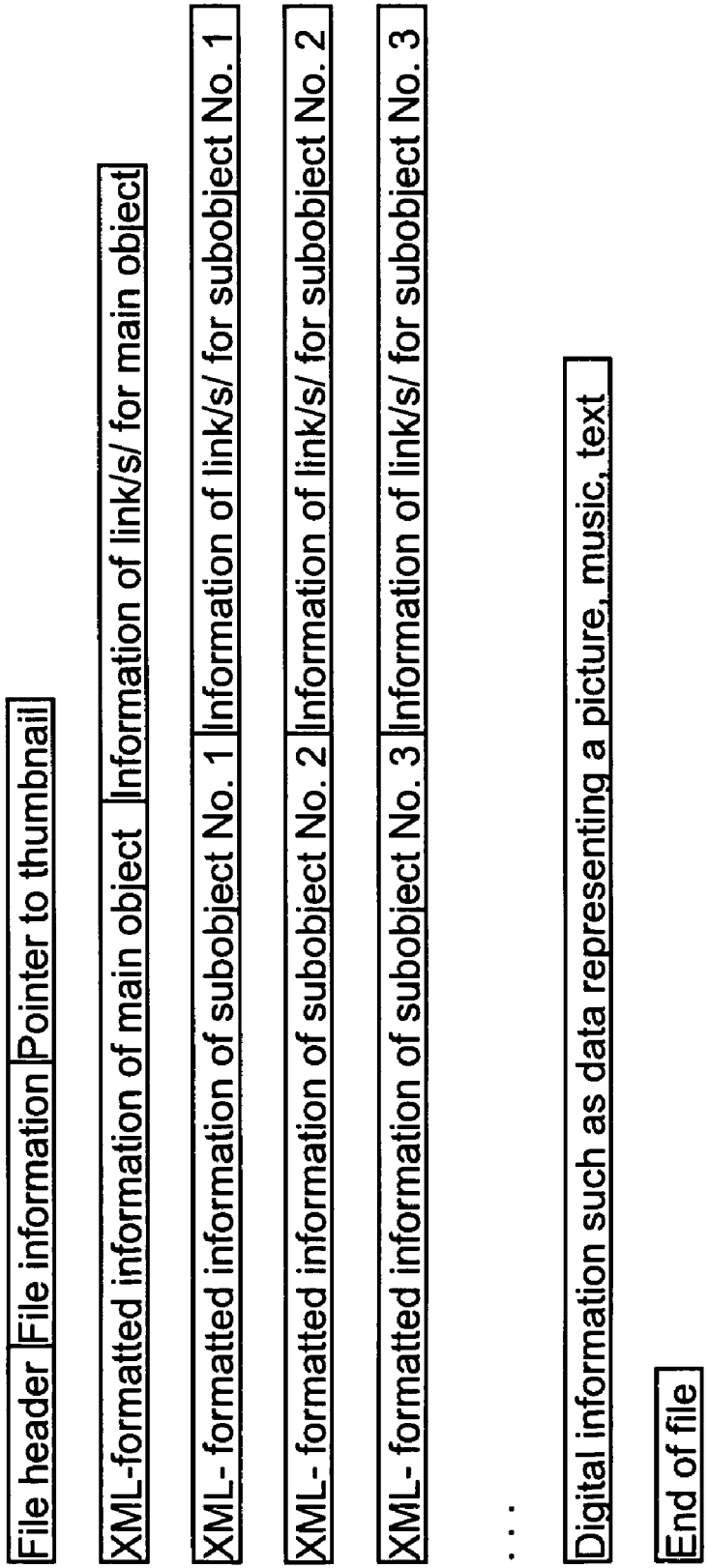
FIG. 4 is a picture illustrating the format of a modified archive file.

A modified archive file for use in archives as described herein has the following general configuration, se also FIG. 4:

File header
File information
Pointer to thumbnail
XML-formatted information of main object (00)
XML-formatted information of link/s/ from main object
XML-formatted information of subobject No. 1 (01)
XML-formatted information of link/si from subobject No. 1
XML-formatted information of subobject No. 2 (02)
XML-formatted information of link/s from subobject No. 2
XML-formatted information of subobject No. 3 (03)
XML-formatted information of link/si from subobject No. 3
. . .
. . .
Main data directly representing a text, a picture, a sound, etc.
End of file Here object No. 00 is the main object and the numbers 01, 02, 03, etc. refer to subobjects or events for a multiobject file.

The XML-information of a main object or of a subobject includes essential information of two kinds, object information and technical information. Object information can include:

Text summarizing the object.
A person's first name.
A person's family name.
Information about name normally used.
Country.
City.
Parish.
Geographical coordinates.
Event date.
Birth date.
Registration date.
Registration archive.
Source.
Technical information can include:
An object number.

Information on position of the object on a photo, in a document or in other file.

Information on shape and size of the object identifier, such as circle or rectangle.

The link information in a main object or a subobject includes essential information of two kinds, object information and technical information. Object information is normally only a short text string summarizing the object linked to. Depending on circumstances other information such as the date of an event, e.g. of birth, and a person's name can be added.

Technical link information includes at least the following parts:

A URL, or generally the address of the file linked to.

A unique object identifier (UID) of the object linked to including linked object number.

An operator (OP) describing the kind or relation between the linked objects or events.

Hierarchical structure information (RANK).

Information, such as a time, of the last successful contact with the other file, for use by link repair algorithms.

Operators in link information are used for describing relations between objects, e.g. relations in a family. Specifically an operator defines a relation between the object for which the link information is given, and the object to which is linked. In the example Lars Andersson<OP>mother</OP>Karin Andersson "Lars Andersson" is a name, title or designation of a main object or a subobject in the considered modified archive file, <OP>mother</OP> is the operator describing the relation to the object to which is linked, and "Karin Andersson" is a name, title or designation of the object to which is linked. In this particular example the relation given by the operator is "mother", i.e. the object to which is linked is the mother of the considered main object or subobject in the considered modified archive file. The opposite relation is given by Karin Andersson<OP>son</OP>Lars Andersson In some cases, such as for family relations, the operator can be replaced by a number, see FIG. 5. The number makes it easier to sort lists and to present the operator in different languages. Thus, the number 11 represents "father" and thus the following two relation definitions have the same meaning:

<OP>father</OP> and <OP>11</OP>

For defining relations, also a definition called rank can be used. It can be regarded as a supplement to the operator. Rank describes the hierarchical structure necessary to build structure trees, such as family trees or parts, subparts and components in a gear box. Rank can have one of six values, see FIG. 5. In some cases, the rank is defined implicitly in the field of the operator OP. For example the operator "father" implies the rank "U" or "UP". Example:

<RANK>U</RANK>

The event rank <RANK>T</RANK> will in most cases be followed by information of when, date and/or time, the event took place. Example: <DATE>1924-11-05</DATE>

The relations are summarized in table 1.

TABLE 1

| BIO RELATIONS | | | |
|---|---|---|---|
| Operator | RANK (implicit) | OP | |
| EGO | — | 00 | Rem: "me" as a family member |
| Parent | U (=UP) | 10 | |
| Father | U | 11 | |
| Mother | U | 12 | |

TABLE 1-continued

| F-Father | U | 13 | |
|---|---|---|---|
| F-Mother | U | 14 | |
| B&S | E (=EQUAL) | 20 | |
| Brother | E | 21 | |
| Sister | E | 22 | |
| Husband | S (=SAME) | 31 | |
| Wife | S | 32 | |
| HS rel man | S | 33 | |
| HS rel woman | S | 34 | |
| Coresident | S | 37 | |
| Friend | S | 38 | |
| Child | D (=DOWN) | 40 | |
| Son | D | 41 | |
| Daughter | D | 42 | |
| F-Child | D | 45 | |
| F-Son | D | 47 | |
| F-Daughter | D | 48 | |
| ME | C (=CLONE) | 49 | Rem: "me" in different phases of life. |

| BIO EVENTS | | |
|---|---|---|
| Operator | | OP |
| Birth | T | 50 |
| School | | 60-69 |
| Confirmation | | 72 |
| Engaged | | 74 |
| Marriage | | 77 |
| Career | | 80-89 |
| Moved in | | 91 |
| Moved out | | 92 |
| Death | | 99 |

A folder or archive 2, see FIG. 3, containing files 1 or a folder with subfolders including one ore more single files are selected and analyzed by the program 4. XML-formatted metadata and link information are entered in the files using the program 4. Links 7 can be between objects, main objects, i.e. the whole file, and subobjects 5, and/or events 6 in the folder 2 as well as to and from files outside the folder. The modified files preserve their file names and their URL.

Figure 8:
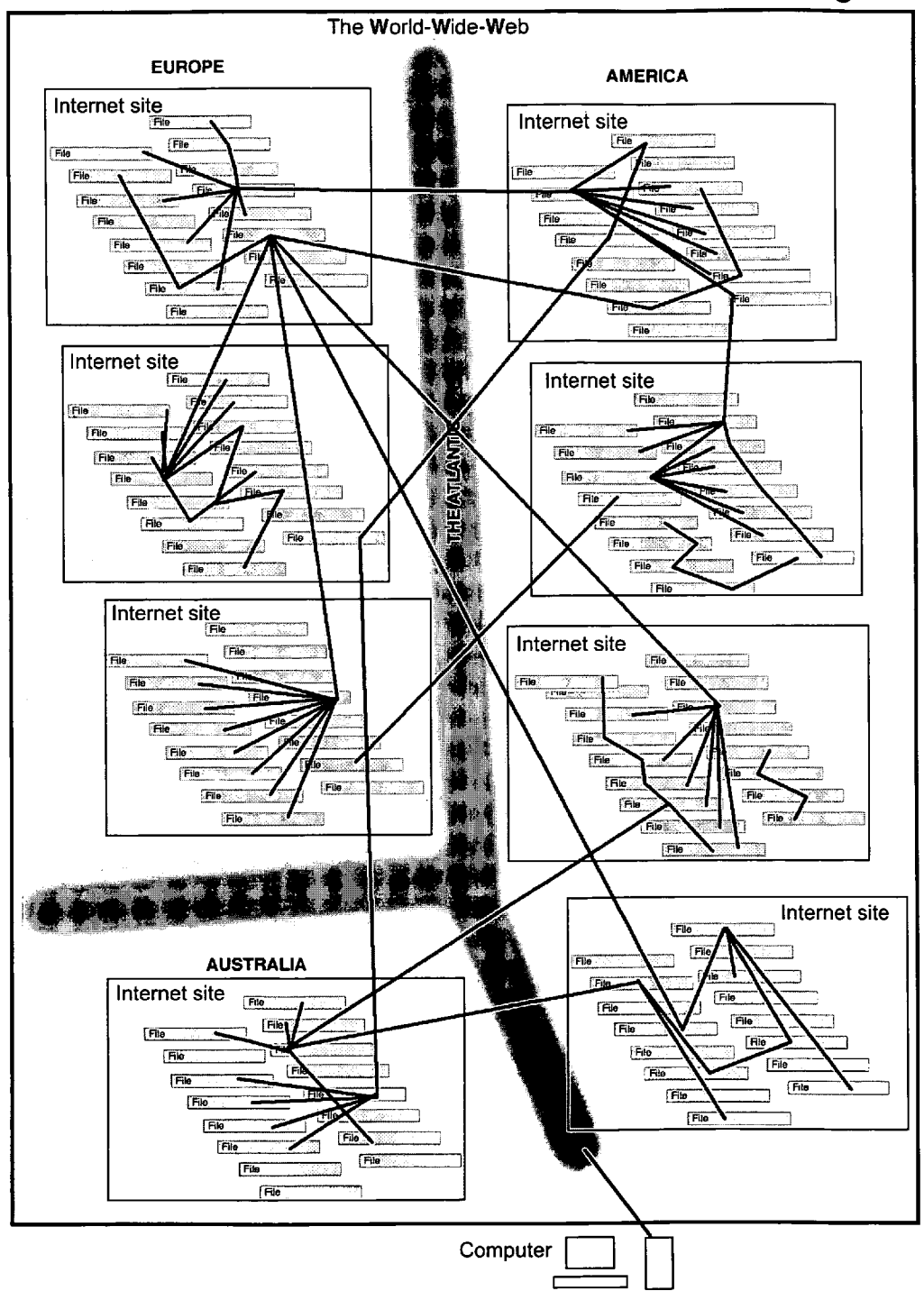
FIG. 8 is a schematic picture of the Internet including servers and a computer connected thereto illustrating worldwide linking of digital files.

In the case where the method is used in a computer connected to the Internet or to a local network, the linked files can be located in different computers connected to the Internet or the other network, respectively. Hence, as is seen in FIG. 8, a world wide general archive can be formed and used by a computer connected to the Internet.

Details of Basic Elements

An Object or Event in a modified archive file is defined in an object information group.

A Link is a set of information within the object information group.

The object information group is located in a linklist called <LinkList>.

The object information group is placed in the linklist for all objects and events since it is not possible to know in advance if an object will have a link now, later or never.

The structure of the linklist is in principle as follo
<LinkList>
|Technical information of object No. 00, the main object|
|Metadata of object No. 00|
|Technical information of the link|
|Metadata in brief of the object linked to|
|Technical information of object No. 01|
|Metadata of object No. 01|
|Technical information of the link|
|Metadata in brief of the object linked to|
|Technical information of object No. 02|
|Metadata of object No. 02|
|Technical information of the link|

|Metadata in brief of the object linked to|
etc.
</LinkList>

Figure 6A:
FIGS. 6a-6f are pictures illustrating how linking is achieved.

The following example, in principle only, refers to a multiobject picture, see FIG. 6a:

| | |
|---|---|
| <LinkList> | Rem: Objects are described in the linklist. |
| <OBJ> | Rem: Beginning of object information. |
| <NR>17</NR> | Rem: Object No. 17 in the list. |
| <Info>Britta Andersson</Info> | Rem: Object information, here a name. |
| <Birth>1924-11-18</Birth> | Rem: Date of birth according to ISO 8601 standard. |
| <Parish>Lofta<Parish> | Rem: Interpreted as place of birth. |
| <XYr>2278-1218-085-FF0000</XYr> | Rem: Position of object in the picture. |
| </OBJ> | Rem: End of object information. |

According to the position information in this example, the object is located in a circle having a radius of 8.5% of the X-dimension of the picture, the circle having its center located with an X-coordinate at 22.78% of the X-dimension of the picture and with a Y-coordinate at 12.18% of the Y-dimension and the color is red. Using this percentage method of indicating the position, the picture can be scaled, the positions of objects not being affected.

Figure 6B:
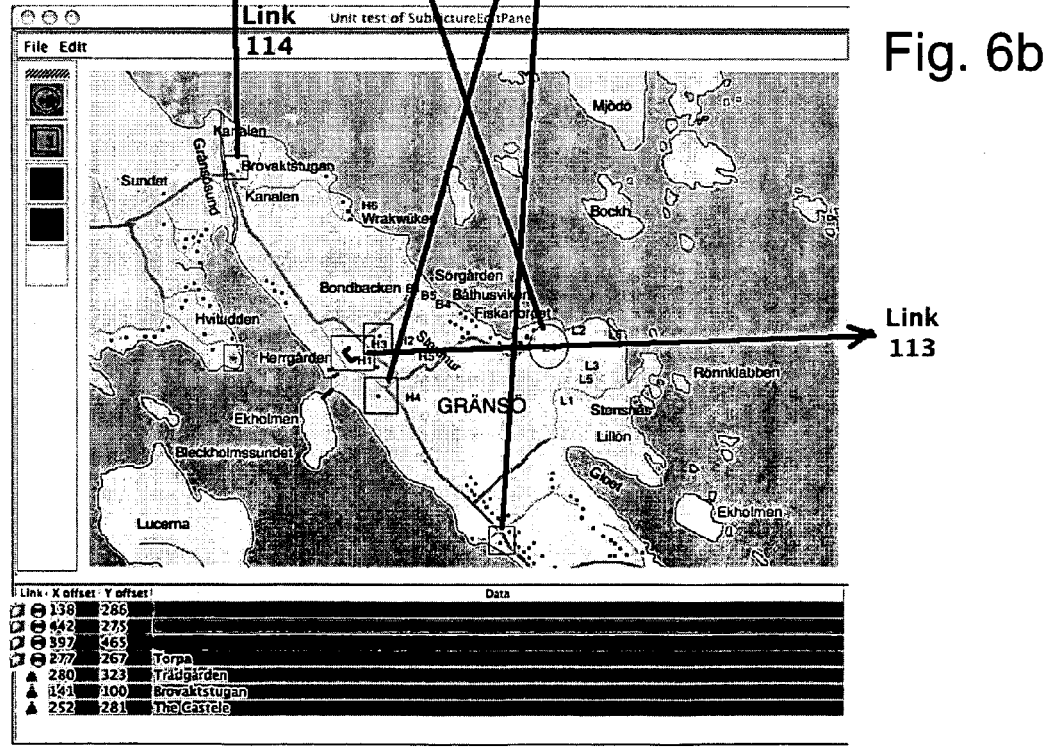
Figure 6C:
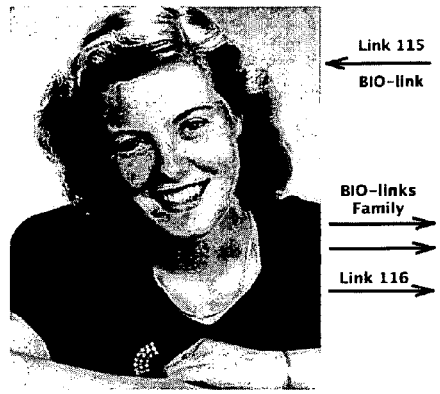
Figure 6D:
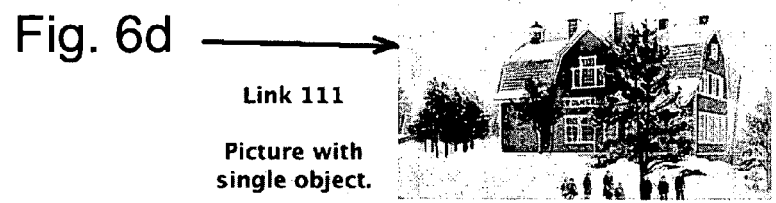
Figure 6E:
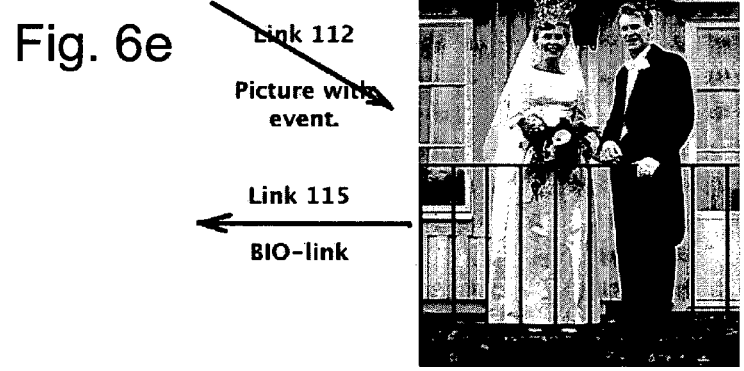
Figure 6F:
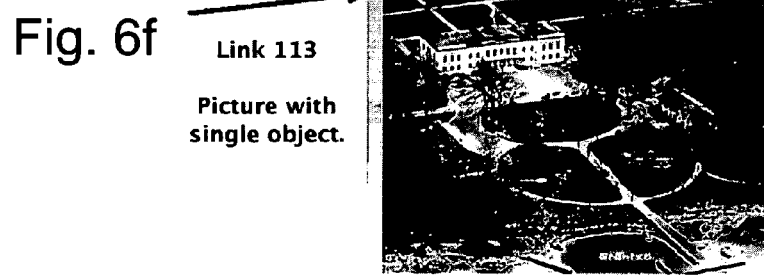

After linking to the map of FIG. 6b, creating link 114, the linklist in the above example is modified as follo

| | |
|---|---|
| <LinkList> | |
| <OBJ> | |
| <NR>17</NR> | |
| <Info>Britta Andersson</Info> | |
| <Birth>1924-11-18</Birth> | |
| <Parish>Lofta<Parish> | |
| <XYr>2278-1218-085</XYr> | Rem: Now follows the link information. |
| <URL>http://www.tjust.com/vastervik/ort/granso/kartor/KaGranso-900.jpg</URL> | |
| <OB>32</OB> | Rem: Identifying the object on the map. |
| <UID>uniqueidentifyingcharacters</UID> | Rem: Unique identifier of file linked to. |
| <INF>Brovaktstugan</INF> | Rem: Information text. |
| </OBJ> | Rem: End of object information. |

In some cases a reverse link is automatically created. The following example illustrates the link 114 from the map to the photograph of a group of people, see FIG. 6b. The reverse link 114 has in principle the following information:

| | |
|---|---|
| <LinkList> | |
| ... | |
| <OBJ> | |
| <NR>32</NR> | |
| <Info>Brovaktstugan</Info> | |
| <GIS><X>1234567</X><Y>2345678</Y><Z>3456789</Z><R>33</R><MAP>RT90</MAP> | |
| </GIS> | |
| <Parish>Lofta<Parish> | |
| <XYr>1822-1452-02-02</XYr> | Rem: Location and size of the rectangle. Rem: Now follows the link information. |
| <URL>http://www.tjust.com/lofta/skola/skolhistoria/skolkort/1935/Klass5o6Lofta1935-W.jpg</URL> | |

| | |
|---|---|
| <OB>17</OB> | Rem: Identifying the object on the photo. |
| <UID>uniqueidentifyingcharacters</UID> | |
| <INF>Britta Andersson f 1924</INF> | |
| </OBJ> | Rem: End of object information. |

The example above includes geographical information, i.e. information one the geo-graphical location of the object linked, such as standardized GIS-information. <X>, <Y> and <Z> are geographical coordinates of the object No. 32 on the map, <R> is the radius of the object and <MAP> describes the kind of coordinates used.

An object in a file is identified by its object number, both in the object information field <NR>(number)</NR> and in the link information field <OB>(number)</OB>.

Short summarizing information of an object is given in a field following the object number definition, such information e.g. being a name, title or designation. Format: <INF>(Information on Object)</INF>

The address of a file linked to is preferably given as a URL (Universal Resource Locator), identifying a location of a resource on the Internet. Format: <URL>(address)</URL>

Typical examples are:

<URL>http://www.tjust.com/arkiv/RK/RK-Flora-tn/RKV-0105tn.jpg</URL>
<URL>file://localhost/TjArk/SCAN2002/RK/MASTER/RK-1106M.tif</URL>

The unique identity (UID) of an object linked to that has been previously set or is being set by the program has the format: <UID>(identification)</UID>

Example: <UID>od32hgspfgpfpg394988</UID>

The UID of an object is formed once, at the creation of the modified archive file containing the data representing the object. Due the unique identity an object can often be found or located also in the case where the file containing the object has been renamed or moved.

The date is the characteristic date of an event, i.e. when it happened, or the birth date of a person. Format: <DATE>(date, time of day)</DATE> where the time information is defined according to ISO 8601.

Example: <DATE>2004-04-01</DATE>

The link date (LDATE) indicates the time, given according to ISO 8601, of the last successful connection over the link. Example: <DATE>2004-04-OIT13:01:02</DATE>

The date of a link can be compared to that of the file, to which is linked by the link, to determine whether the file has changed since the latest contact through the link.

The operator indicates the relation to the file or object to which it is linked. Format: <OP>(specified relation information)</OP>

Examples of general operators and rank operators directly specifying direction or relative position in the hierarchical level system have been listed above and include e.g.:
<OP>mother</OP>
<RANK>U</RANK>

Figure 5:
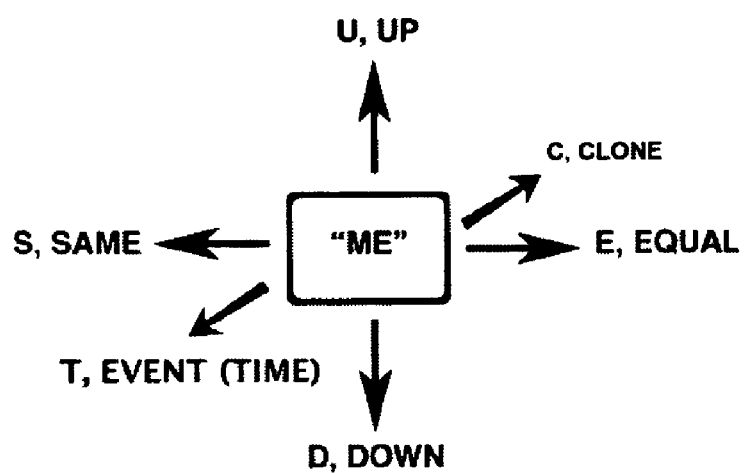
FIG. 5 is a picture illustrating an operator called rank in hierarchical schemes for example family relations.

Here the rank operators can e.g. basically be five types, see FIG. 5:

"U"="UP" denotes a superior or higher hierarchical level, e.g. parent or a set of furniture in relation to a chair.

"S"="SAME" denotes the hierarchical level, e.g. wife, partner, close friend or a table in relation to a chair.

"E"="EQUAL" denotes equal hierarchical level, e.g. brother, sister.

"C"="CLONE" denotes another file containing the same object, e.g. two photographs of the same chair.

"D"="DOWN" denotes an inferior or lower hierarchical level, e.g. child in relation to father or seat in relation to a chair.

The relational operators such as "mother", "son" has the implicit ranks of "UP", "DOWN" respectively.

In the link field it is also allowed to provide free text information on the object linked to. Format: INF>(information)</INF>

Furthermore, it is possible to enter data blocks in the links. An example of data blocks includes geographical information, i.e. information one the geographical location of the object linked, such as standardized GIS-information. Example:
<X>1234567</X><Y>2345678</Y><Z>3456789</Z><R>33</R><MAP>RT90</MAP>.
where R defines the width of the object, in the example 33 m, MAP indicates the type of map which in the example is the coordinate system RT90 used in Sweden. In the case where the type of map is missing, the X- and Y-coordinates indicate the number of pixels from the top left corner of the picture to the center of the picture, i.e. the object.

With reference to FIGS. 6a-6f a specific example will be described. FIG. 6a is an image shown on a computer display including a picture showing a photograph of an object including a group of people belonging to two school classes in the Lofta school. This object is a main object of a modified archive file containing the digital file representing this photograph. In the photograph also some of the persons are identified as separate subobjects. The main object is defined in the modified archive file by the following XML-elements where also information about the main object is given and a link to the original graphical file containing the digital information representing the photograph:

| | |
|---|---|
| <OBJ> | Rem: Start of object field |
| <NR>0</NR> | Rem: 0 indicates a main object |
| <INF>Lofta school, classes 3+4 and female teacher Ebbesson</INF> | |
| <DATE>1933-04-10</DATE> | Rem: Date associated with object |
| <Country>SE</Country> | Rem: Geographical data following ISO 3166 |
| <State>Småland</State> | |
| <Parish>Lofta</Parish> | |
| <URL>http://www.tjust.com/arkiv/lofta/skola/1933/0.jpg</URL> | |
| | Rem: Address/URL of this graphical file |
| <UID>4f16d3a7-8bfc-11d8-8c44-defb1c</UID> | Rem: Universal identifier of the graphical file and the main object thereof |
| </OBJ> | Rem: End of object and link fields |

In the same modified archive file another object, a person being one of the pupils, is defined:

| | |
|---|---|
| <OBJ> | Rem: Start of first subobject field |
| <NR>1</NR> | Rem: Subobject No. 1 |
| <NF>Irene Elisabeth</NF> | Rem: Biographical data, first name |
| <NL>von Bottner</NL> | Rem: Biographical data, last name |
| <NU>1,2</NU> | Rem: Name normally used = Irene Bottner |
| <XYr>2214-6237-085</XYr> | Rem: Position and size of object in picture, object located 22.14% horizontally and 62.37% vertically of the respective picture dimension and radius of object is 8.5% of the picture X-size (Alternatively, the subobject can be defined by a rectangular field instead of a circular one) |

| | |
|---|---|
| | Rem: Start of second link field, corresponds to arrow 114 in FIGS. 6a, 6b |
| <URL>http://www.tjust.com/0200420SWeSee/gen/20PIC/map234.tif</URL> | |
| | Rem: Address of file representing a map, FIG. 6b |
| <OB>23</OB> | |
| <UID>8c44-defb1c1fcf34-4f16d3a7-8bfc-11d2</UID> | |
| <INF>This is a link to a place on a map</INF> | |
| </OBJ> | Rem: End of subobject fields |

For defining a subobject by a rectangular field, the following lines can be used:

```
<Y1>73.5802</Y1>
<X1>01.6304</X1>
<Y2>99.0123</Y2>
<X2>76.6304</X2>
where for example <Y1>73.5802</Y1> defines the location
of the upper side of the rectangle.
```

The same definition of the locations of the sides can be used together with the line
<Shape>Oval</Shape>
to indicate an oval, i.e. elliptic, shape, of the field where the respective subobject is located.

A second similar subobject, also a pupil, is defined in the same modified archive file:

```
<OBJ>
<NR>2</NR>
<Info>Nana Lundgren</Info>
<XYr>6674-5544-085</XYr>
<URL>file://20200420WeSee/PRODUKTION2004/20PIC/LC-event.tif</URL>
```
| | Rem: Link illustrated by arrow 112, see FIGS. 6a, 6d, to file representing photograph of wedding, see FIG. 6d |
|---|---|
| <UID>8c44-defb1c1fcf34-4f16d3a7-8bfc-11d6</UID> | |
| <OP>wedding</OP> | |
| <INF>The wedding</INF> | |
| </OBJ> | |

A third subobject, the school building, is defined in the same modified archive file:

```
<OBJ>
<NR>3</NR>
<Info>Lofta School building 1936</Info>
<XYr>3278-5218-066</XYr>
<URL>http://www.tjust.com/arkiv/lofta/skola/1936/byggnad.jpg</URL>
```
| | Rem: Link illustrated by arrow 111, see FIG. 6a to file representing photograph of the school building, see FIG. 6d |
|---|---|
| <OB>0</OB> | Rem: Main object linked to, can be omitted |
| <UID>8c44-defb1c1fcf34-4f16d3a7-8bfc-11d23</UID> | |
| <RANK>S</RANK> | |
| </OBJ> | |

The creation of subobjects in a picture such as in FIG. 6a is made be selecting the circle or rectangular tool on the menu and color to be used, for defining objects. Then a suitable closed curve such as a rectangle or circle is shown having e.g. handles for modifying its size in the manner used in graphical programs. The curve is moved to the position of a shown object such as the head of a person, the size of the curve is changed to make the curve enclose the head and then the object is defined by double-clicking inside the curve or pressing the Enter key. The program then creates an identifier and produces the following definition fields:

| | |
|---|---|
| <OBJ> | Rem: Start of first subobject field |
| <NR>1</NR> | Rem: Subobject No. 1 |
| <XYr>2214-6237-085</XYr> | Rem: Position and size of object in picture |
| </OBJ> | Rem: End of first subobject field |

After an object has been defined, a corresponding line appears at the bottom of the display, see FIGS. 6a and 6b. In the line short information of the object can be introduced. The program then produces fields located between the delimiting terms <OBJ> and </OBJ> such as the name of the object:
<nfo>Irene Johansson</Info>

The creation of the links between objects in two pictures such as those shown in FIGS. 6a and 6b can be made by a drag-and-drop method. It is assumed that the objects of these pictures have already been defined, the objects indicated on the display by the enclosing curves. The two pictures can be shown at the side of each other on the same display. By selecting a suitable tool, not shown, the tool indicated by some symbol such as an arrow on the display, moving the arrow to inside an object in a first of the pictures, pressing the left mouse button and dragging the enclosing curve to at least partly overlap an enclosing curve in the other, second picture and then releasing the mouse button the link is created. The program then produces e.g. the following fields located between the delimiting fields <OBJ> and </OBJ> of the subobject selected in the first picture:

| | |
|---|---|
| <URL>http://www.tjust.com/0200420SWeSee/gen/20PIC/map234.tif</URL> | Rem: Address of file representing second picture |
| <OBJ>04</OBJ> | Rem: Link to subobject No. 4 of the picture represented by the second file |
| <UID>8c44-defb1c1fcf34-4f16d3a7-8bfc-11d2</UID> | Rem: Universal identifier of the main object of the file containing the object linked to |
| </OBJ> | Rem: End of object and link field |

A return link can be created in the file representing the second picture by selecting a corresponding line of a menu, not shown.

If there are no subobjects defined in the file representing the second picture, the entire file is regarded as an object and the link will be to the file only, the link information then including only the field delimited by <URL> and </URL>.

After having created the objects and their links, additional information such as the operator <OP> and <RANK> information can be added. Then, the user selects a corresponding tool, selects an object on the displayed picture by clicking inside one of the curves enclosing subobjects or clicking outside all such curves, in the latter case selecting the main object.

Figure 7:
FIG. 7 is a picture shown on a computer display when running a link archive browser, in this case a biographic browser.

A biographic view is shown on the computer display, see the example of FIG. 7. The picture 201 of the main object is shown in a small window that can be expanded if desired. The short information is shown in other windows 205 and additional, specific information can be entered in various fields. The created links are seen in middle window 207, having one line for each object. The short information for each object linked to is seen to the right on each line and in the left portion of each line a field 209 is provided for entering the relational information. In the bottom window 211 events linked to are shown, one line for each event. The lines include short information defining and explaining the respective events.

When clicking on the button "Save" all the entered or modified information on the shown page is saved.

It is obvious to one skilled in the art that the method and system as described above can be modified in a plurality of ways. For example, the modified archive files do not have to contain the data directly representing objects, i.e. pictures, texts, sound, etc. Instead this data can be allowed to remain in the original unchanged files. The modified archive files can be given names associating them with the original files such as image001.tif.xmp corresponding to an original file image001.tif. In this case the address in the definition of the main object will point to the original file instead of to the modified archive file itself. This is the normal situation when working over Internet where files cannot be modified, only linked to.

Figure 9A:
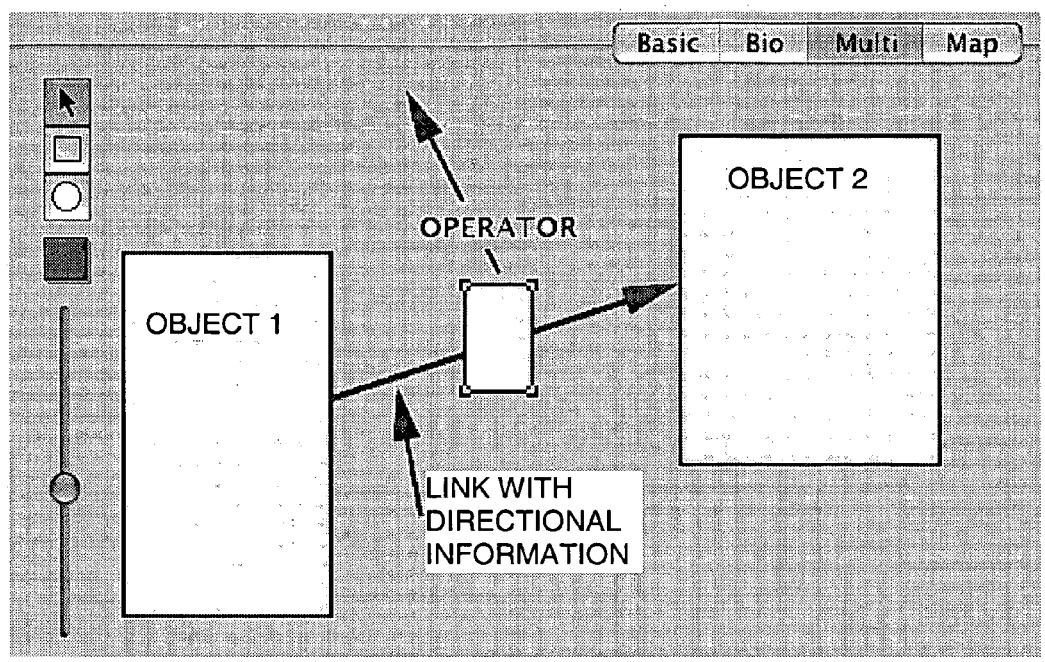
FIG. 9a is a schematic illustrating linking objects together with address, operator and rank information.

The basic principle of linking objects together with address, operator and rank information is also illustrated in the picture of FIG. 9a.

Figure 9B:
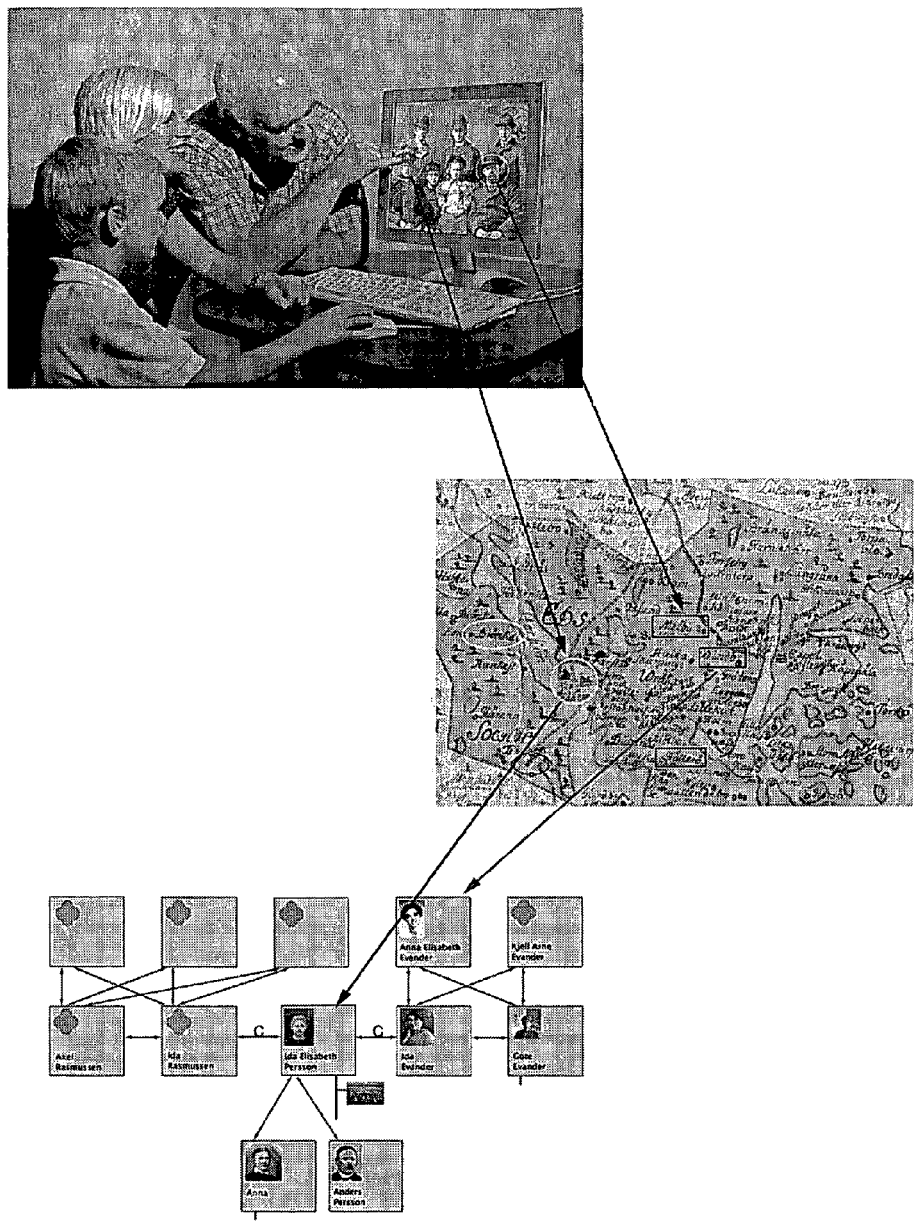
FIG. 9b is a composite picture illustrating practical use of a method for linking objects.

In FIG. 9b the practical use of the method is further illustrated. Thus, in original pictures, documents and maps picture objects can be identified. The objects can be linked together and the links can extend over the Internet. Links can easily be created and allow browsing in the network. Composite and complex structures such as genealogical tables, switchgears having a multitude of components, organizations and tourist information can be described.

The method as described herein has the following advantages compared to traditional technology:

Meta information about pictures and documents is stored in the files themselves. If a file is moved, the information automatically accompanies it. In traditional technology the meta information is stored in a database in some other place. If a picture is sent by e-mail, the information muse be sent detached therefrom.

No pedantic tidiness is required. If the picture or document is in your computer, you will find it. In traditional technology database systems require a pedantic discipline. Files changing their name or that are moved can be lost for ever.

If the file changes its name, the information is still there. In traditional technology, if the file is moved or the file name is changed, the information is lost.

It is easy to identify objects in a picture or on a map. In traditional technology the identifying of objects in a picture is complicated.

Files as well as objects can be linked to each other. In traditional technology files and objects can not be linked together with databases and HTML-documents.

Meta information can be retrieved even after 100 years. In traditional technology, sooner or later e.g. an image file and a database storing information thereof will lose the contact or association with each other.

Information can be stored in many languages but in the computer only a specific language is seen. In traditional technology the handling of a multitude of languages is complicated.

500,000,000 people connected to Internet around the world can use the method described herein but in traditional technology only companies and organizations with employed staff can use the information in image files and similar files.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

The invention claimed is:

1. A method for creating links between a plurality of objects or objects and events described in a plurality of digital files comprising a digital archive, each of the plurality of digital files being a text, graphical or sound file or a combinations of text, graphical and sound files, the method comprising the steps of:

accessing at least a first digital file, the first digital file containing XML-formatted content data describing at least one object or event represented in said first digital file, and entering in said first digital file XML-formatted metadata comprising link information to link at least one other, associated object or event to the at least one object or event described by the content data in the first digital file, the content data and metadata being packed together in the first digital file so as to form one single file that contains both the content data and metadata and that is not part of a database, wherein single files containing content data and corresponding metadata links created by the method are storable in one computer, anywhere where the single files can be accessed through a local network or anywhere in the world where the single files can be accessed through the Internet or a similar general purpose network.

2. The method according to claim 1, wherein the step of entering the link information in the first digital file comprises:

forming on a display a first picture derived from content data in the first digital file describing the first picture, text, or a document and metadata describing object(s) in the first picture, text or document, selecting one object in the picture, text or document of the first digital file, forming on the display a second picture or icon derived from data related to a second folder, file or object or from a third file with which the second picture or icon is associated, thereby creating a link from said one object in the first picture to the formed second picture or icon shown on the display representing the second folder, file or object or third file, indicating that said one object is a starting point for a link to a target which is the second folder, file or object or the third file with which the second picture or icon is associated, saving link data in the first digital file's metadata which defines the indicated first object and a pointer or address to the target.

3. The method of claim 1 or 2, wherein the link information includes a vector describing the position of the linked target relative to the starting point, wherein such vector can be concrete, such as (examples) UP, LEFT, IN, CLONE or 56°*23°, or associative, such as (examples) ME→FATHER, ME→BROTHER, ME→WIFE, and wherein the method further comprises the step of saving said link information in the first digital file's object information area.

4. The method of claim 1 or 2, wherein the link information includes an operator describing relations between the object where a link starts and a target of the link, and wherein the operator can be text, picture, sound, film, a computer program or a sub-link to a file containing such link information, and wherein the method further comprises the step of saving said link information in the first digital file's object information area.

5. The method of claim 1 or 2, wherein the link information includes a copy of a Unique IDentifier ("UID") corresponding to the target's Unique IDentifier stored by any program in a file describing the target or an operating system ("OS") file archives or the target and operating system file archives, which makes it possible to search for the target when necessary, and wherein the method further comprises the step of saving said link information in the first digital file's object information area.

6. The method of claim 1, wherein the XML-formatted data has an XMP-format.

7. The method of claim 1, wherein the link information includes address or pointer information for the other associated object or event and relational information defining the relation between the at least one object or event described by the content data in the first digital file and the other associated object or event linked to.

8. The method of claim 1, the links created by the method are distributed throughout local or global networks or local and global networks to form composite structures between different distributed picture and document archives, folders, files and objects.

* * * * *